United States Patent [19]
Ernest

[11] 3,770,037
[45] Nov. 6, 1973

[54] SELF-CLINCHING STUD WITH A MODIFIED HEAD

[75] Inventor: Richard B. Ernest, Richboro, Pa.

[73] Assignee: Penn Engineering & Manufacturing Corp., Danboro, Pa.

[22] Filed: Dec. 15, 1971

[21] Appl. No.: 208,134

[52] U.S. Cl. .............................................. 151/41.73
[51] Int. Cl. .......................................... F16b 39/282
[58] Field of Search .......................... 151/68, 41.73

[56] References Cited
UNITED STATES PATENTS

| D219,953 | 2/1971 | Ernest | D8/267 |
| 973,470 | 10/1910 | Bogle | 151/68 |
| 1,968,516 | 7/1934 | Dieter | 151/68 |
| 3,127,919 | 4/1964 | Swanstrom | 151/41.73 |
| 3,687,501 | 8/1972 | Wilson et al. | 151/41.73 |

FOREIGN PATENTS OR APPLICATIONS
548,068  10/1957  Canada

*Primary Examiner*—Edward C. Allen
*Attorney*—Joseph G. Denny et al.

[57] ABSTRACT

A self-clinching stud to be embedded into thin sheeted material is provided with a head comprising two non-circular members rotated relative to each other so as to provide for resistance to torque forces.

10 Claims, 6 Drawing Figures

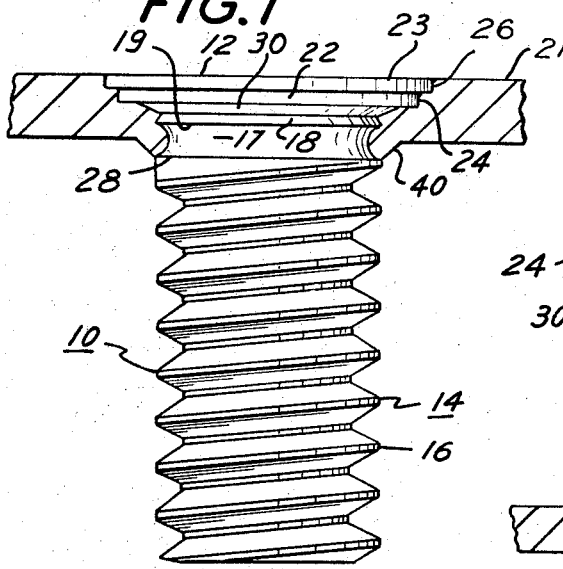
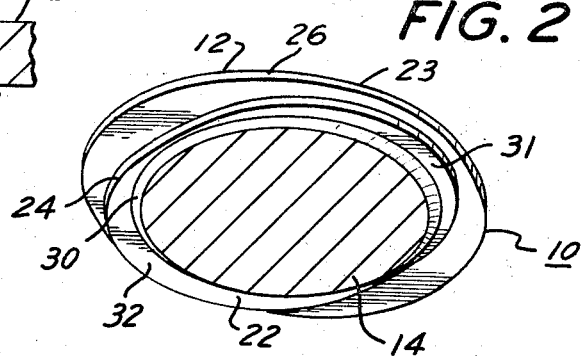
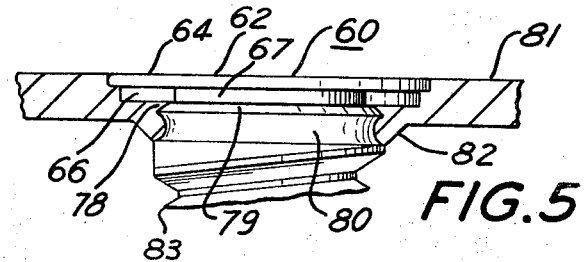
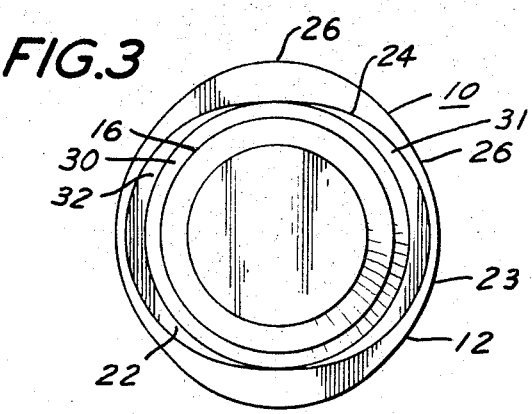
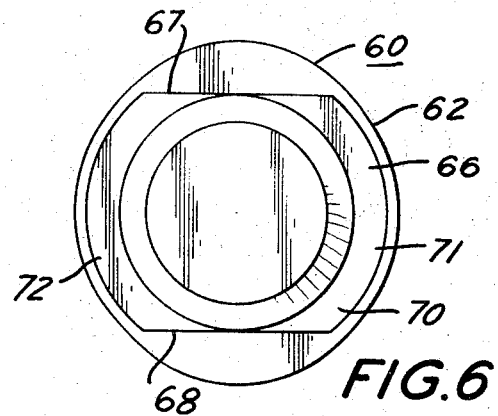
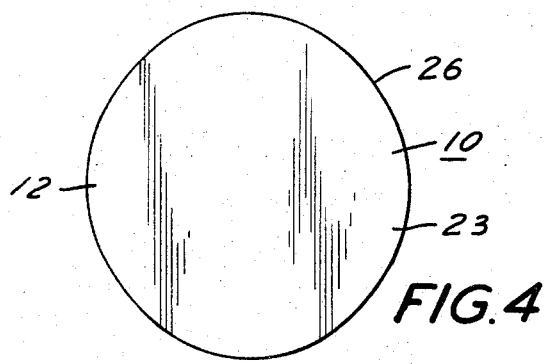

As shown, the flange 22 and the platform 23 include continuous, annular and peripheral surfaces 24 and 26, respectively.

Thus, between the beveled wall 30 and the annular, peripheral surface 24 (of the flange 22), the flange 22 may be considered to have two crescent-like shapes, 31 and 32, FIG. 2, the crescent-like shapes 31 and 32 being symmetrically disposed about (and on opposite sides of) the major axis of the platform 23.

When the shank 14 of the stud 10 is placed through a suitable hole in the plate 21, the plate 21 being supported by a suitable anvil (not shown) and the head 12 is driven by a suitable punch (not shown) into the plate 21, the head 12 countersinks and locks itself flush with the upper surface of the sheeted material, as shown in FIG. 1, and because of the non-circular shapes of the flange 22 and of the platform 23, the resistance of the stud to torque forces is increased above what it would be were they circular and concentric.

Also, referring to FIGS. 2 and 3, it is seen that when the flange 22 is embedded in the plate, the two crescent-like shapes 31 and 32 of the flange will also help to resist torque forces imposed upon the stud.

It is seen that the peripheral surface 26 of the platform 23 is at a right angle to the upper, flat surface of the platform 23 which also adds in resisting torque forces. Also, the lower, flat surface of the platform 23 is parallel to the upper surface thereof. The peripheral surface 24 of the flange 22 is at a right angle to the lower, flat surface of the platform 23 defining therewith a shoulder which also helps in resisting the torque forces. Further, the peripheral surface 24 is at a right angle to the lower, flat surface of the flange 22.

While the preferred shape of the flange 22 has been described as "generally elliptical," this is intended to include an elongated, curved shape such as would be formed by two overlapping circular shapes whose centers are displaced from each other by a small distance and whose outer peripheries are connected (on opposite sides) by lines tangent to both circles.

The lower or first recess 17 is defined by a wall which is approximately semi-circular of C-shaped in cross section, as illustrated in FIG. 1, and has a volume larger than the volume of the upper or second recess 18 and receives the sheeted material displaced by the head 12 in excess of that which can be accommodated by the upper recess 18. As shown in FIG. 1, a depending bead 40 (varying in size depending on the thickness of the plate 21) will extend below the lower surface of the plate 21, the bead 40 of sheet material is received into and defined by a suitable opening in an anvil (not shown).

Referring to FIGS. 5 and 6, a modification of this invention is shown in which the stud 60 is formed with head 62 having a generally elliptical platform 64 and a generally circular flange 66 having cut-away or segmented sides 67 and 68. The flat lower surface 70 of the flange 66, hence, defines two symmetrical, arcuate segments 71 and 72 on opposite sides of the longer axis of the elliptical platform 64.

In the embodiment of FIGS. 5 and 6, the upper recess 78 is formed by the flat lower surface 70 and the tapered surface 79. (The lower recess 80 has a semi-circular or C-shape, as shown.) Because the upper recess is formed between the lower surface 70 and the tapered surface 79, in the embodiment of FIG. 5, that is, no beveled wall such as the wall 30 shown in the embodiment of FIG. 1 is used, for the same thickness of platform and flange in the two embodiments, the embodiment of FIG. 5 is better adapted for thinner plates. For example, with a platform thickness of between 0.008 and 0.011 inches and a flange thickness of between 0.014 and 0.016 inches, in both embodiments, the configuration shown in FIG. 1 is satisfactory for a 0.065 inch plate whereas that shown in FIG. 5 is satisfactory for a 0.050 inch plate.

Another advantage resulting from the modified stud heads shown herein is that the beads 40 (FIG. 1) and 82 (FIG. 5) are more uniform than that resulting from the structure shown in prior U.S. Pat. No. 3,127,919 (FIG. 6 thereof). That is, each prong of the stud shown in U.S. Pat. No. 3,127,919 resulted in a corresponding pod of displaced sheet material. In the present invention the crescent-like shape of the embodiment shown in FIGS. 1 to 4 results in a depending bead which varies substantially uniformly and corresponding to the crescent-like shapes 31 and 32 (FIG. 2). Also, with regard to the embodiment shown herein in FIG. 6, the segments 71 and 72 may be considered to be two long, flat thin ribs circular on their ends to thus displace a more uniformly annular bead, without the pod-like characteristic of the prior art.

As in the previous embodiment, the shank 83 (shown partially in FIG. 5) is placed through a suitable hole in the plate 81, the plate 81 being supported by a suitable anvil (not shown) and the head 62 is driven flush into the plate 81, a depending bead 82 being formed at that time.

The preferred method of making the self-clinching studs disclosed herein is to cold head, i.e., cold forge, a cylindrical slug (not shown) of suitable material. The cold heading is done with a die (not shown) having a cavity cut to the contour of either the generally elliptical flange 22 or the elongated flange 66. The material of the slug ahead of the flange abutts an anvil (not shown) to restrict longitudinal movement of the slug, but radially outward movement of the material ahead of the slug is permitted freely. Thus, because the slug is initially cylindrical, the material ahead of the flange is cold headed into a generally elliptically shaped platform with the major axis of the platform coinciding with the minor axis of the generally elliptical flange or the elongated flange to form headed blanks. Thereafter, the threads and recesses are rolled on the cold headed blanks.

While not illustrated, another modification of this invention would provide a circular platform and a circular flange, but the platform and flange would be non-concentric with each other.

Having described the invention, I claim:

1. In the combination of
    a sheeted material having first and second surfaces and a hole therethrough,
    a stud including a head and a shank,
        said shank extending through said hole,
            said shank having a threaded portion spaced from said head,
        said shank having first and second undercut recesses between said threaded portion and said head,
        said first recess being closer to said threads than second recess,
        said head being driven into said sheeted material flush with said first surface,

SELF-CLINCHING STUD WITH A MODIFIED HEAD

BACKGROUND OF THE INVENTION

This invention relates to self-clinching studs to be embedded into thin sheeted material and is a further modification of the studs shown and claimed in U.S. Pat. No. 3,127,919 and U.S. Design Pat. No. D-219,953.

SUMMARY OF THE INVENTION

The object of this invention is to improve the studs shown in U.S. Pat. No. 3,127,919 and U.S. Design Pat. No. D-219,953.

As mentioned in U.S. Pat. No. 3,127,919, this type of stud is particularly adapted for use in comparatively soft sheeted material or plates, such as cold rolled steel and aluminum alloys, and relatively hard materials, such as stainless steel, which are in thin, sheeted form, i.e., about 1/16 of an inch thick.

Further, this type of stud when embedded in the sheeted material results in a joinder between the stud and the sheeted material wherein the top surface of the stud is flush with the top surface of the sheeted material and securely locked thereto with high torque and push-out resistance.

Although high torque and pushout resistance is important, it is also commercially desirable that the embedded head of the stud and the surrounding sheeted material present an attractive and smooth appearance. It has been found in practice that customers prefer a head which is circular or nearly circular in appearance when viewed from the top surface of the plate after the head is embedded. However, a completely circular head would not provide sufficient torque resistance in certain applications. Also, customers prefer a smooth, continuous surface at the jointure between the stud head and the sheeted material.

It was found that when a stud made in accordance with FIGS. 1 to 7 of U.S. Pat. No. 3,127,919 was installed in sheeted material, the sheeted material radially outwardly of each prong tended to be compressed and flowed upwardly, as the annular surface of the prong restrained the sheeted material from flowing downwardly into the undercut recesses of the stud. This upward flow of material resulted in an annular array of small teats which, while they did not hamper the function of the stud, were objected to by some customers on an aesthetic basis.

While the embodiment shown in FIG. 8 of U.S. Pat. No. 3,127,919 does not include prongs, the resistance to torque forces is lower than when prongs are used. Further, it was found that the solid head (i.e., a head with no prongs), because of its thickness, tended to draw the plate material down around the annular surface of the head, creating a small, annular approximately V-shaped void between the upper surface of the head and the upper surface of the sheeted material.

To eliminate the teats and yet to retain the torque resistance advantages of the prongs, the prongs were terminated short of the outer diameter of head, creating an overhanging platform, as shown in U.S. Design Pat. No. D-219,953, but it was found that in order to have a commercially economical stud, the overhanging platform had to be of such thickness that, as it was pressed into the sheeted material, the sheeted material tended to be drawn down and a small, annular V-shaped void again resulted between the platform and the sheeted material. This void could be almost eliminated by making the platform (overhanging the prongs) thinner, but tool life would be significantly decreased, because of the great increase in pressure on the edges of the die at the plurality of small cavities in the die (corresponding to the prongs formed in the head).

To eliminate the teat formation associated with the stud shown in U.S. Pat. No. 3,127,919 and to eliminate drawing down of the sheeted material around the heat associated with the stud shown in U.S. Des. Pat. No. D-219,953, I have modified the heads of these studs so that they are formed by two non-circular members. The two non-circular members are preferably in rotated relation to each other.

The foregoing and other objects of this invention, the principles of this invention, and the best modes in which I have contemplated applying such principles will more fully appear from the following description and accompanying drawings in illustration thereof.

BRIEF DESCRIPTION OF THE VIEWS

FIG. 1 shows the stud of this invention in side elevation and mounted in a plate, the plate being shown in cross section;

FIG. 2 is a fragmentary, perspective view taken from the bottom, as viewed in FIG. 1, but omitting the shank of the stud;

FIG. 3 is a bottom view of the stud illustrated in FIG. 1, but omitting the plate illustrated in FIG. 1;

FIG. 4 is a top view of the stud illustrated in FIG. 1, but omitting the plate;

FIG. 5 is a partial view similar to FIG. 1, but illustrating a modification of the stud; and FIG. 6 is a bottom view of the stud illustrated in FIG. 5.

DESCRIPTION OF THE PREFERRED EMBODIMENTS

Referring to the drawings, FIG. 1 shows a self-clinching stud 10 having a head 12 and a depending integral shank 14, the major portion of the shank 14 being provided with threads 16 adapted to receive a fastener. The shank 14, between the threads 16 and the head 12, is provided with two annular undercut recesses or cavities 17 and 18 separated from each other by a crest 19, the recess 17 being separated from the threads by a crest 28. The cavities 17 and 18 receive displaced material, as shown in FIG. 1, which flows into the cavities 17 and 18 when the stud 10 is driven into a thin sheeted member or plate 21 to permanently secure the stud to the plate 21.

The head, in accordance with this invention, comprises two flat, pancake-like non-circular members 22 and 23. To better distinguish the members 22 and 23, the lower member 22 will be hereinafter referred to as a "flange" and the upper member 23 will be referred to as a "platform." In the preferred form, the platform 23 has a generally elliptical shape and overhangs the flange 22 which also has an elliptical shape, but is rotated 90° relative to the platform 23, i.e., the minor axis of the flange 22 overlies and is coincident with the major axis of the platform 23, as best shown in FIG. 3.

Depending from the flange 22 is an integral, beveled wall 30 forming with the upper surface of the crest 19, a general V-shape defining the recess 18.

a portion of the material of the sheet adjacent said stud being forced by said head to flow into said second recess and toward said first recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having generally elliptical shapes rotated about 90° relative to each other,
whereby, as the head is driven into the sheeted material, both the platform and the flange displace a portion of the material of the sheeted material adjacent the stud and into said recesses.

2. In the combination of
a sheeted material having first and second surfaces and a hole therethrough,
a stud including a head and a shank,
said shank extending through said hole,
said shank having a threaded portion spaced from said head,
said shank having first and second undercut recesses between said threaded portion and said head,
said first recess being closer to said threads than second recess,
said head being driven into said sheeted material flush with said first surface,
a portion of the material of the sheet adjacent said stud being forced by said head to flow into said second recess and toward said first recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated shapes rotated relative to each other when viewed in the plane of said head which is at right angles to and transverse to the longitudinal axis of said stud, and
said flange defines two crescent-like shapes generally symmetrical about the longer axis of said platform,
whereby, as the head is driven into the sheeted material, both the platform and the flange displace a portion of the material of the sheeted material adjacent the stud and into said recesses.

3. The structure recited in claim 2 wherein said flange defines two arcuate shaped members generally symmetrical about the longer axis of said platform.

4. In the combination of
a sheeted material having first and second surfaces and a hole therethrough,
a stud including a head and a shank,
said shank extending through said hole,
said shank having a threaded portion spaced from said head,
said shank having first and second undercut recesses between said threaded portion and said head,
said first recess being closer to said threads than second recess,
said head being driven into said sheeted material flush with said first surface,
a portion of the material of the sheet adjacent said stud being forced by said head to flow into said second recess and toward said first recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated, elliptical shapes rotated 90° relative to each other when viewed in the plane of said head which is at right angles to and transverse to the longitudinal axis of said stud,
said platform and said flange having parallel flat surfaces embedded in said sheeted material,
said annular surfaces of said platform and of said flange being smooth and continuous surfaces generally at right angles to said flat surfaces, and
said flange defining two crescent-like shapes generally symmetrical about the longer axis of said platform,
whereby, as the head is driven into the sheeted material, both the platform and the flange displace a portion of the material of the sheeted material adjacent the stud and into said recesses.

5. In the combination of
a sheeted material having first and second surfaces and a hole therethrough,
a stud including a head and a shank,
said shank extending through said hole,
said shank having a threaded portion spaced from said head,
said shank having first and second undercut recesses between said threaded portion and said head,
said first recess being closer to said threads than second recess,
said head being driven into said sheeted material flush with said first surface,
a portion of the material of the sheet adjacent said stud being forced by said head to flow into said second recess and toward said first recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated, elliptical shapes rotated 90° relative to each other when viewed in the plane of said head which is at right angles to and transverse to the longitudinal axis of said stud, said platform and said flange having parallel flat surfaces embedded in said sheeted material, said annular surface of said platform and of said flange being smooth and continuous surfaces generally at right angles to said flat surfaces, and said flange defining two arcuate shaped members generally symmetrical about the longer axis of said platform, whereby, as the head is driven into the sheeted material, both the platform and the flange displace a portion of the material of the sheeted material adjacent to the stud and into said recesses.

6. In a self-clinching stud having
a head and a shank,
said shank having a threaded portion spaced from said head,
said shank having first and second undercut recesses between said threaded portion and said head,
said first recess being closer to said threads than second recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having generally elliptical shapes rotated about 90° relative to each other,
whereby, as the head is driven into a sheeted material, both the platform and the flange displace a portion of the material of the sheeted material adjacent the stud and into said recesses.

7. In a self-clinching stud having
a head and a shank,
said shank having a threaded portion spaced from said head,
said shank having first and second undercut recesses between said threaded portion and said head,
said first recess being closer to said threads than second recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated shapes rotated relative to each other when viewed in the plane of said head which is at right angles to and transverse to the longitudinal axis of said stud, and
said flange defining two crescent-like shapes generally symmetrical about the longer axis of said platform,
whereby, as the head is driven into a sheeted material both the platform and the flange displace a portion of the material of the sheeted material adjacent the stud and into said recesses.

8. In a self-clinching stud having
a head and a shank,
said shank having a threaded portion spaced from said head,
said shank having first and second undercut recesses between said threaded portion and said head,
said first recess being closer to said threads than second recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated shapes rotated relative to each other when viewed in the plane of said head which is at right angles to and transverse to the longitudinal axis of said stud, and
said flange defining two arcuate shaped members generally symmetrical about the longer axis of said platform,
whereby, as the head is driven into a sheeted material both the platform and the flange displace a portion of the material of the sheeted material adjacent the stud and into said recesses.

9. In a self-clinching stud having
a head and a shank,
said shank having a threaded portion spaced from said head,
said shank having first and second undercut recesses between said threaded portion and said head,
said first recess being closer to said threads than second recess,
the volume of said first recess being larger than the volume of said second recess,
the improvement wherein said head comprises
a non-circular platform having an annular surface, and
an undercut non-circular flange between said second recess and said platform,
said flange having an annular surface radially inwardly of said platform and radially outwardly of said threaded portion,
said platform and said flange having elongated, elliptical shapes rotated 90° relative to each other when viewed in the plane of said head which is at right angles to and transverse to the longitudinal axis of said stud,
said platform and said flange having parallel flat surfaces for being embedded in said sheeted material,
said annular surfaces of said platform and of said flange being smooth and continuous surfaces generally at right angles to said flat surfaces, and
said flange defining two crescent-like shapes generally symmetrical about the longer axis of said platform, whereby, as the head is driven into a sheeted material, both the platform and the flange displace a portion of the material of the sheeted material adjacent the stud and into said recesses.

10. In a self-clinching stud having a head and a shank, said shank having a threaded portion spaced from said head, said shank having first and second undercut recesses between said threaded portion and said head, said first recess being closer to said threads than second recess, the volume of said first recess being larger than the volume of said second recess, the improvement wherein said head comprises a non-circular platform having an annular surface, and an undercut non-circular flange between said second recess and said platform, said flange having an annular surface radially inwardly of said platform and radially outwardly of said threaded portion, said platform and said flange having elongated, elliptical shapes rotated 90° relative to each other when viewed in the plane of said head which is at right angles to and transverse to the longitudinal axis of said stud, said platform and said flange having parallel flat surfaces embedded in said sheeted material, said annular surfaces of said platform and of said flange being smooth and continuous surfaces generally at right angles to said flat surfaces, and said flange defining two arcuate shaped members generally symmetrical about the longer axis of said platform, whereby, as the head is driven into a sheeted material both the platform and the flange displace a portion of the material of the sheeted material adjacent the stud and into said recesses.

* * * * *